United States Patent [19]

Desbois

[11] 3,774,337

[45] Nov. 27, 1973

[54] LIVE BAIT FISHHOOK

[76] Inventor: Theodore J. Desbois, 423 Hyde Park Blvd., Niagara Falls, N.Y. 14303

[22] Filed: Jan. 31, 1972

[21] Appl. No.: 222,061

[52] U.S. Cl. ............................................. 43/44.6
[51] Int. Cl. ........................................... A01k 83/06
[58] Field of Search................... 43/44.6, 44.2, 43.1, 43/43.15, 43.16, 43.4, 43.6, 44.4, 44.8, 44.82, 44.87

[56] References Cited
UNITED STATES PATENTS

| | | | |
|---|---|---|---|
| 2,781,605 | 2/1957 | Eilermann............................ | 43/44.2 |
| 2,927,393 | 3/1960 | Flamisch et al...................... | 43/44.6 |
| 2,894,351 | 7/1959 | Doane................................. | 43/44.6 |
| 2,257,403 | 9/1941 | Vandine............................... | 43/44.6 |
| 2,651,133 | 9/1953 | Sharps................................. | 43/42.37 |

Primary Examiner—Louis G. Mancene
Assistant Examiner—Gregory E. McNeill
Attorney—Joseph P. Gastel

[57] ABSTRACT

A fishhook for holding live bait comprising a shank having a longitudinal axis mounting a flexible resilient base from which a plurality of prongs extend in opposition to each other laterally of said shank. By applying a flexing force to the base, the prongs are spread apart to receive live bait therebetween and after the force is released from the base, its resilience will cause the prongs to impale the bait firmly yet gently.

11 Claims, 13 Drawing Figures

Patented Nov. 27, 1973
3,774,337
2 Sheets-Sheet 1
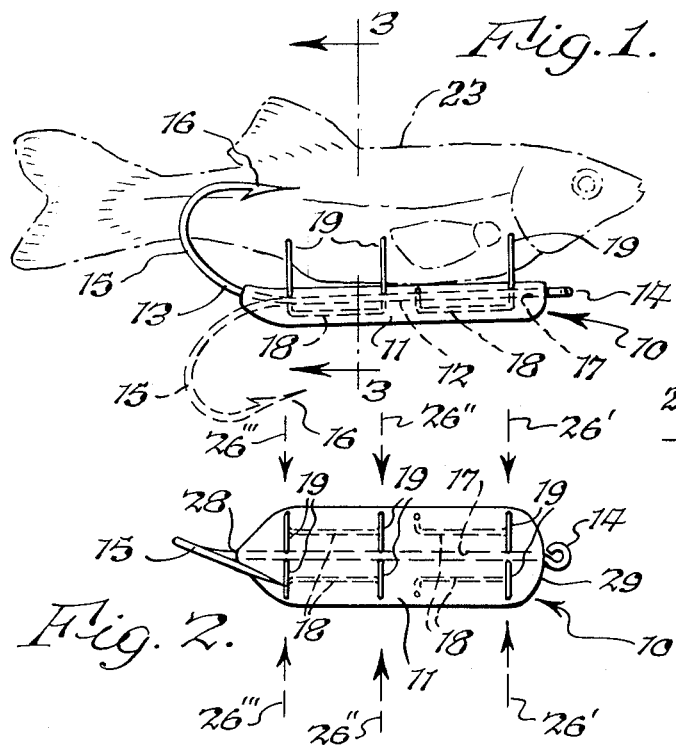
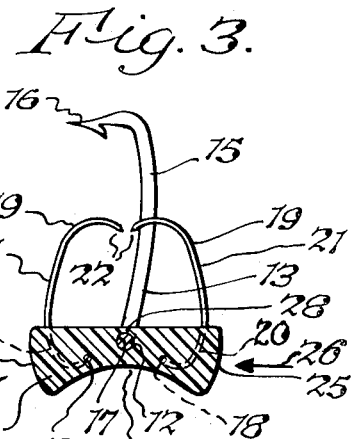
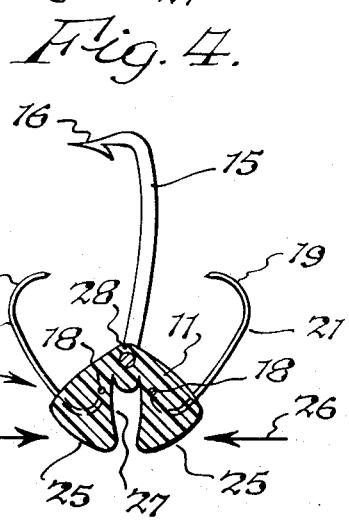
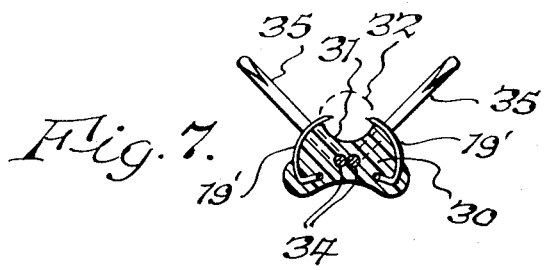
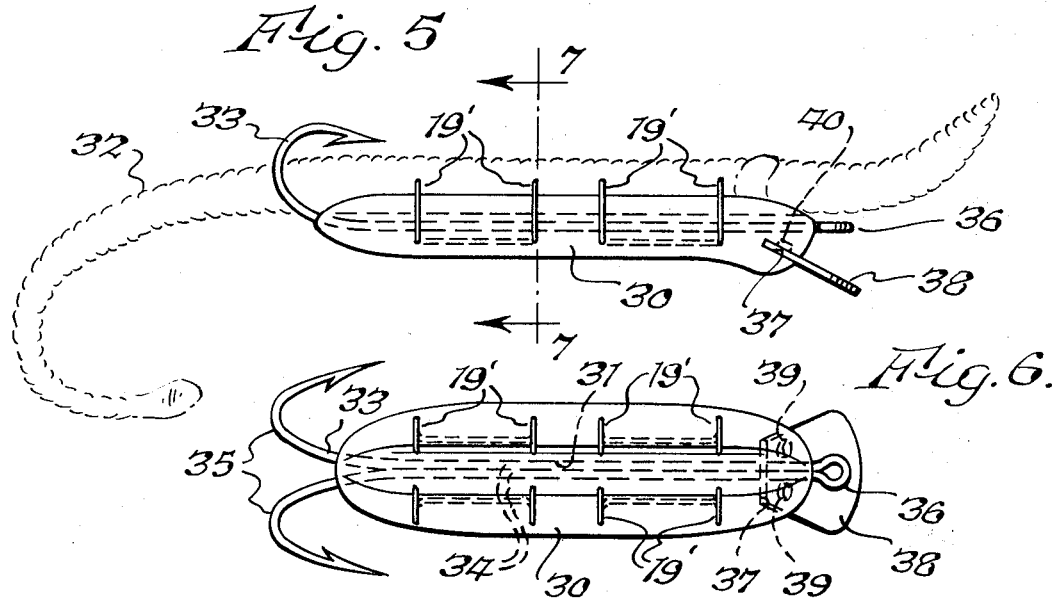

Patented Nov. 27, 1973 3,774,337

LIVE BAIT FISHHOOK

The present invention relates to an improved fishhook of the type which has live bait mounted thereon.

Various types of fishhooks for carrying live bait have been devised in the past. However, they were subject to certain deficiencies. Certain types tied the bait down relatively rigidly so that it was incapable of producing a natural type of movement which was desired. Other types impaled the bait severely so that it could not live long after having been attached to the hook. Still other types required a great amount of skill and effort to properly mount the bait on the hook. Still other types were relatively complex, which was undesirable for an item such as a fishhook. It is with overcoming the foregoing deficiencies of the prior art types of live bait mounting fishooks that the present invention is concerned.

It is accordingly one object of the present invention to provide an improved live bait holding fishhook which will hold the live bait firmly yet gently without substantially injuring the bait other than just pricking its skin.

Another object of the present invention is to provide a live bait holding fishhook on which the live bait can be mounted easily, simply and rapidly.

Still another object of the present invention is to provide an improved live bait holding fishhook in which the fish catching hook portion can be moved to an out-of-the-way position during mounting of the bait so as not to interfere with this action and can thereafter be returned to a fishing position after the bait has been mounted.

A further object of the present invention is to provide an improved live bait holding fishook which is extremely simple in construction and yet highly effective in achieving its intended function. Other objects and attendant advantages of the present invention will readily be perceived hereafter.

The improved fishhook of the present invention comprises a shank having a longitudinal axis, a hook portion secured to said shank, bait impaling prong means and means mounting said bait impaling prong means for movement transversely relative to said shank to impale the side of said live bait extending substantially longitudinally of said shank to thereby mount said bait. Preferably the prong means are mounted on a flexible base which can be distorted to spread the prongs apart and after the bait is placed between the prongs the force on the distorted resilient base is relieved so as to cause the prongs to impale the bait. The various aspects of the present invetion will be more fully understood when the following portions of the specification are read in conjunction with the accompanying drawings wherein:

FIG. 1 is a side elevational view of the improved live bait holding hook of the present invention showing a minnow mounted thereon in phantom;

FIG. 2 is a plan view of the hook shown in FIG. 1;

FIG. 3 is a cross sectional view taken substantially along line 3—3 of FIG. 1;

FIG. 4 is a view similar to FIG. 3 but showing the bait mounting base distorted by opposing forces for the purpose of spreading the bait engaging prongs incidental to the mounting of the bait;

FIG. 5 is a side elevational view of a modified form of live bait holding hook having a lip thereon for causing the hook to wiggle;

FIG. 6 is a plan view of the hook shown in FIG. 5;

FIG. 7 is a cross sectional view taken substantially along line 7—7 of FIG. 5;

Figure 8:
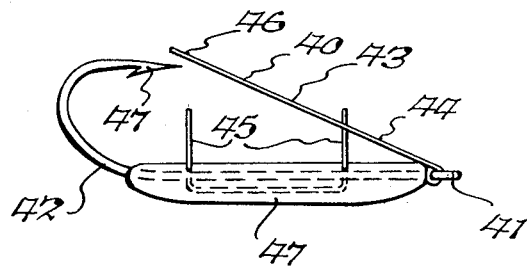
FIG. 8 is a side elevational view of a modified form of the hook of the present invention including weed guard structure.

One form of the improved live bait holding hook 10 of the present invention is shown in FIGS. 1–4. The hook 10 includes a base 11 through which the shank 12 of hook 13 extends so that eye 14 protrudes from one end of base 11 and bend 15 having barb 16 thereon extends from the opposite end of base 11. Shank 12 is received in bore 17 of base 11.

Base 11 is preferably fabricated from molded resilient plastic or rubber-like material so that it will retain the normal cross sectional configuration shown in FIG. 3 when it is not distorted by external forces. Embedded in base 11 are the base portions 18 of lateral impaling prongs 19. The lowermost portions 20 of prongs 19 are also embedded in base 11. The external portions 21 of lateral prongs 19 terminate at pointed ends 22. Prongs 19 are preferably flexible, springy and fabricated from relatively thin wire, but they need not necessarily be flexible.

In order to mount live bait such as minnow 23 on hook 10, it is merely necessary to grasp opposite sides 25 of base 11 between the thumb and forefinger and apply opposing forces on sides 25 in the direction of arrow 26, as shown in FIGS. 3 and 4. Because the undersurface 27 of base 11 is concave, base 11 under the influence of forces 26, will become distorted to the configuration shown in FIG. 4. This is possible because of the flexibility of base 11 and also because the portion 28 of base 11 above shank 12 is sufficiently thin to permit base 11 to flex. Base portions 18 of the prongs will not interfere with flexing of base 11 because they extend lengthwise of base 11.

In order to mount bait 23, it is placed in substantially the position shown in FIG. 1 relative to base 11, and thereafter the sides 25 of base 11 are released so as to remove forces 26 whereupon lateral prongs 19 will impale the opposite sides of bait 23 to hold it firmly in position in a gentle manner which permits the live bait 23 to swim under its power while being held firmly. Because prongs 19 merely prick the skin of the minnow they will not kill it.

The mounting of minnow 23 can be effected by a series of steps. First of all, the prongs 19 at the rightmost portion of base 11 can be spread apart by applying opposing forces such as 26', as shown in FIG. 2. This permits the pair of prongs 19 which are substantially aligned with forces 26' to impale the fish proximate its head when forces 26' are released. Thereafter forces 26" are applied to opposite sides of base 11 in the vicinity of the central pair of prongs 19 so as to cause these prongs to impale the body of bait 23. Thereafter forces 26''' are applied in the vicinity of prongs 19 at the left of base 11 so as to impale the portion of bait 23 closest to the tail. By the sequence of applying forces 26', 26'' and 26''' to the base 11, successive lengthwise portions of the bait can be sequentially attached to base 11. The advantage of the sequential impaling of the bait from head to tail in increments is that it is not difficult to hold the live bait while it is being impaled because only one pair of opposing prongs are impaled into the bait before the next pair is impaled. While the bend 15 of hook 13 is shown relatively close to the tail of minnow 23, it is preferable that this hook be located substantially at the midlength of the minnow so as to permit its tail to have full freedom of movement.

It is to be especially noted that since the prongs 19 merely prick the skin of bait 23, there is no blood or guts commong out of the bait after it is mounted, thereby permitting the bait to live longer and also not be messy. Furthermore, because of the fact that the inherent resiliency of base 11 causes the hooks 19 to impale the opposite sides of the bait 23, there is no necessity for actually goring the fish actively, thereby eliminating this aspect which may be objectionable to women. The arrangement described relative to FIGS. 1-4 can be used with any type of suitable bait, such as minnow, worms and soft shell crabs.

Preferably the base 11 is fabricated without hook 13 mounted therein, that is, it is fabricated as shown with a bore 17 to receive the shank 12 of hook 13. Actually, in order to thread the shank 12 into bore 17, it is merely necessary to insert eye 14 into bore 17 at the left end 28 of base 11 and push it from left to right in FIG. 2 until it protrudes from right end 29. The foregoing is possible because of the resilience of base 11. It is to be noted that shank 12, while mounted in base 11, can be rotated from a fully upright solid line position shown in FIG. 1 to the dotted line position, thereby removing the bend 15 from interfering contact with bait 23 while the latter is being mounted. However, after bait 23 has been fully mounted so that all prongs 19 are in position, bend 15 of hook 13 can be moved to the solid line position by applying a rotating force thereto. Because base 11 is made out of a rubber-like composition, it will have good frictional engagement with shank 12 so as to hold the hook 13 in the position to which it was last rotated. If the above type of action is not desired, the hook can be molded into the base so that it will not be rotatable.

In FIGS. 5, 6 and 7 a modified embodiment of the present invention is disclosed. This embodiment includes base 30 which may have all of the characteristics described in detail above relative to base 11 except that the upper portion 31 is concave to receive the body of bait worm 32 in complementary mating engagement so as to cradle the body of the bait against movement off of base 30. Furthermore four pairs of prongs 19', which are analogous to prongs 19, are used, instead of three pairs shown in FIGS. 1-4. At this point it will be noted that any number of pairs of prongs, such as 19 and 19', may be used anywhere from one pair for very small bait up to any number of pairs in excess of four shown in FIG. 5 for larger types of bait. Another difference in the embodiment of FIGS. 5-7 is that the hook 33 has a double shank 34, and two bends 35 with the shanks 34 terminating at eye 36, as shown in FIG. 6. The base 30 is provided with a slot 37 for receiving a lip member 38 for making the base 30 wiggle, thereby causing the bait 32 to look alive even if it is not. Lip 38 can have button portions 39 thereon which are received in mating apertures 40 in base 30 to permit it to be removable with a snap-in type of action. Alternatively, lip 38 can be formed integrally with base 30.

Figure 9:
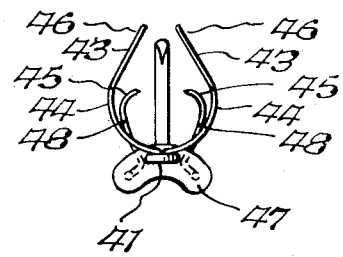
FIG. 9 is an end elevational view taken from the right of FIG. 8.

A further embodiment of the present invention is shown in FIGS. 8 and 9, this embodiment having a weed guard 40 secured to eye 41 of hook 42. The weed guard 40 includes a pair of spaced legs or whiskers 43 mounted on eye 41 at one end, a bowed out intermediate portion 44 which will not interfere with the bait held by prongs 45, and portions 46 terminating proximate barb 47 so as to guard it from picking up weeds. Aside from the foregoing structure, the base 47 is analogous to the bases 11 and 30 of the preceding embodiments, and prongs 45 are also analogous except that the lower portions 48 thereof are closer together than the lower portions of the prongs shown in the preceding embodiments to thereby provide more of a holding force on the opposite sides of the bait.

Figure 10:
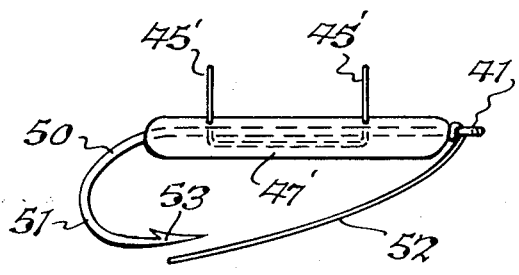
FIG. 10 is a modified form of the present invention showing a hook with the weed guard below the bait holding portion.
Figure 11:
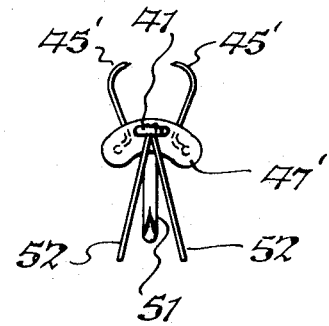
FIG. 11 is an end elevational view taken substantially from the right of FIG. 10.

Another weedless construction is shown in FIGS. 10 and 11. The base 47' and prongs 45' may be identical in all respect to those shown above in FIGS. 8 and 9. However, the bend 51 of hook 50 is located on the opposite side of base 47' from prongs 45', and the weed guard consists of two relatively straight whisker-like members 52 for guarding barb 53.

Figure 12:
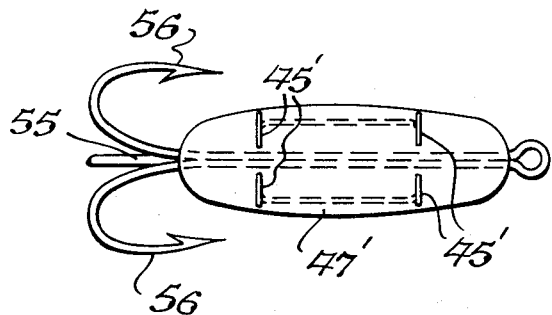
FIG. 12 is a plan view of a further modified hook of the present invention showing a three-pronged hook.
Figure 13:
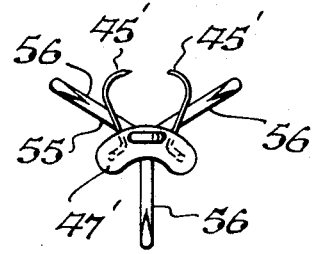
FIG. 13 is an end elevational view taken substantially from the right of FIG. 12.

A still further embodiment of the present invention is shown in FIGS. 12 and 13 wherein the most significant aspect is that hook 55 has three bends 56 rather than the single and double bends discussed above.

What is claimed is:

1. A fishhook for holding live bait comprising a shank having a longitudinal axis, a hook-portion secured to said shank, bait impaling prong means, and flexible resilient base means mounted on said shank for mounting said bait impaling prong means separate from said shank for movement transversely relative to said shank to impale opposite sides of said live bait extending substantially longitudinally of said shank to thereby mount said bait on said fishhook, said flexible resilient base means causing said prongs to be spread apart by the application of a flexing force to said base and causing said prongs to impale said bait under the bias of said flexible resilient base when said flexing force is removed from said base.

2. A fishhook for holding live bait as set forth in claim 1 including bore means in said base for removably mounting said base on said shank.

3. A fishhook for holding live bait as set forth in claim 1 wherein said prong means comprise a plurality of prongs spaced longitudinally from each other on opposite sides of said shank with certain of said prongs connected to each other by base portions embedded in said base, said base portions extending longitudinally of said base.

4. A fishhook for holding live bait as set forth in claim 1 wherein said prong means comprise flexible thin wire members.

5. A fishhook for holding live bait as set forth in claim 1 wherein said base includes an upper surface and a lower concave surface.

6. A fishhook for holding live bait as set forth in claim 5 wherein said upper surface is of a contour for cradling engagement with said bait.

7. A fishook for holding live bait as set forth in claim 1 wherein said shank is rotatable on said base to permit mounting of said bait on said base when said hook portion is positioned on the opposite side of said base from said prong means.

8. A live bait holding base for mounting on a fishhook comprising a body defining a flexible resilient base member, mounting means on said resilient base member for mounting on the shank of a fishhook, and bait impaling prong means having first portions embedded in said resilient base member and second portions extending in opposition to each other externally of said resilient base member to impale said live bait therebetween.

9. A live bait holding base for mounting on a fishhook as set forth in claim 8 wherein said mounting means comprises an elongated bore in said resilient base member for receiving said shank of said fishhook in frictional gripping engagement.

10. A live bait holding base for mounting on a fishhook as set forth in claim 8 wherein said resilient base member includes a top surface and a concave bottom surface.

11. A live bait holding base for mounting on a fishhook as set forth in claim 8 wherein said bait impaling prong means comprise a plurality of springy wire-like members.

* * * * *